W. E. SAWYER.
Device for Effecting the Static Discharge in Autographic Telegraphy.
No. 196,833. Patented Nov. 6, 1877.
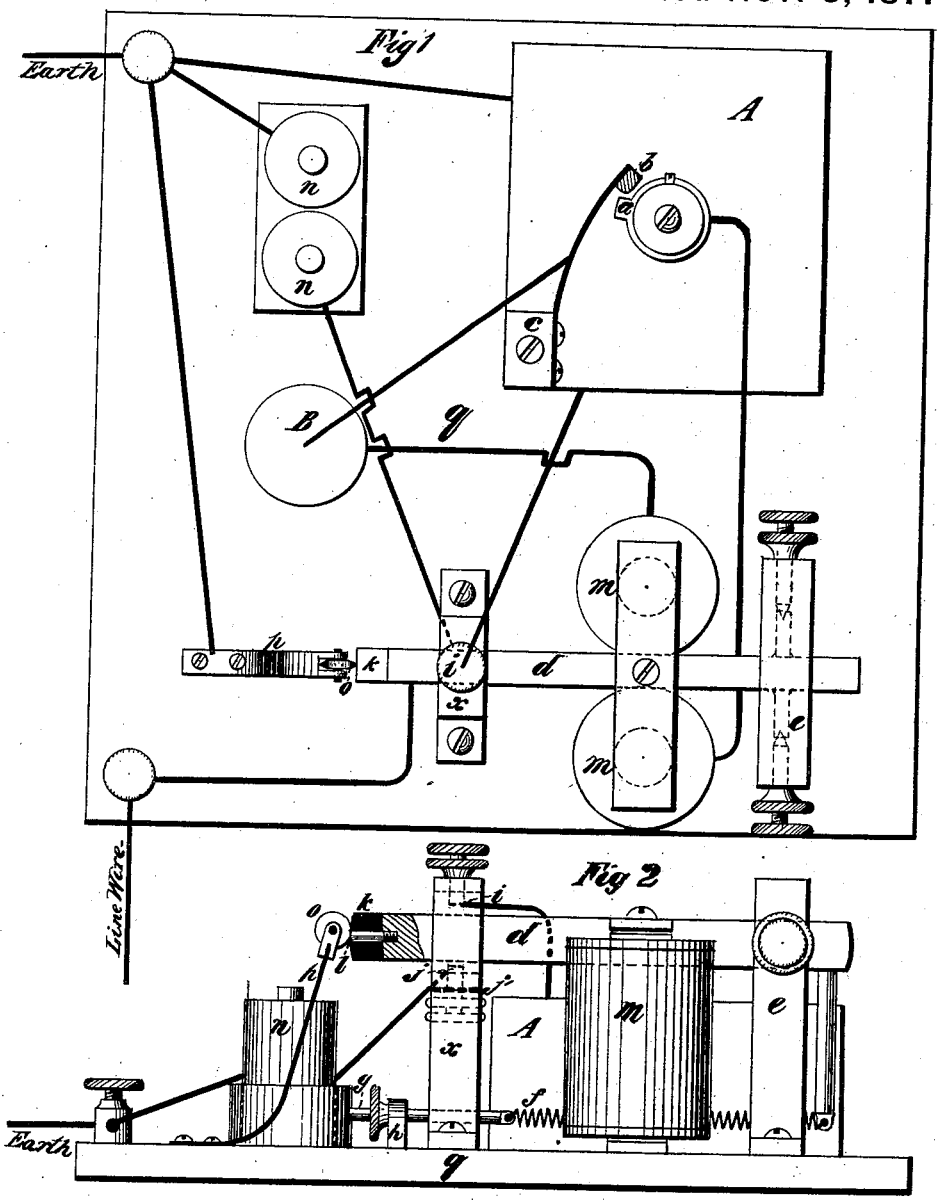
Witnesses.
Chandler Hall
Robert P Gilmer
Inventor.
William Edward Sawyer

UNITED STATES PATENT OFFICE.

WILLIAM E. SAWYER, OF NEW YORK, N. Y.

IMPROVEMENT IN DEVICES FOR EFFECTING THE STATIC DISCHARGE IN AUTOGRAPHIC TELEGRAPHY.

Specification forming part of Letters Patent No. 196,833, dated November 6, 1877; application filed June 29, 1877.

*To all whom it may concern:*

Be it known that I, WILLIAM EDWARD SAWYER, of the city, county, and State of New York, have invented certain new and useful Improvements in Autographic, Copying, or Fac-Simile Telegraph Apparatus, of which the following is a clear, full, and exact description.

In the operation of autographic telegraphs, where isochronous movement of distantly-separated instruments is maintained by the transmission of currents of electricity over the line connecting them, the static charge of the line is found to be a serious obstacle to accurate or rapid work.

In all such telegraphs the electric impulses of the transmitting battery or batteries, which have no relation to the regulation of the instruments, charge the line to such an extent that when the instruments arrive at the regulating-point, where electro-magnetic apparatus are placed in circuit, the static charge is oftentimes so strong as to prevent the regulation of the regulating current or currents by reason of its actuating the electro-magnetic apparatus before the proper time or times. To obviate this difficulty is the design of my present invention.

Referring to the drawings accompanying and forming a part of this specification, in which Figure 1 is a top, and Fig. 2 a side, view, A represents the transmitting or receiving instrument; and $a$, $b$, and $c$, attachments thereto.

The nature, construction, and action of autographic-telegraph instruments being so well understood, and having been so fully set forth in Letters Patent heretofore granted to me, I have not deemed it necessary to show more than the position of the same in the present instance.

The spring $b$ upon the insulating-piece $c$ is touched by the cam $a$ once in every revolution of the cam. From the connection thus made the magnet $m$ is actuated by local battery B, thus changing the circuit of the line from the transmitting or receiving apparatus to the electro-magnetic apparatus $n$, by which the transmitting or receiving apparatus is periodically regulated. The armature-lever $d$ has its bearing in standard $e$, fixed to base $q$, $f$ being the usual retractile spring, the tension of which is regulated by adjusting-screw $g$ in standard $h$.

Held in standard $x$, and insulated from each other by insulating-piece $j'$, are two contact-screws, $i$ and $j$, which make connection, alternately, with lever $d$. Surrounding the pointed end $l$ of lever $d$ is an insulating-piece, $k$, which, when the lever is either up or down, isolates it from the contact-roller $o$, held by spring $p$. The roller $o$ is connected to earth or a discharging-battery with or without a condenser. The lever $d$ is connected to the line-wire. The upper contact-screw $i$ is connected to one side of the transmitting or receiving apparatus A, the other side of which is connected to earth, or to batteries and earth. The lower contact-screw $j$ is connected to the electro-magnetic regulating apparatus $n$, and thence to earth, or to battery and earth.

To clearly illustrate the operation of my invention, let it be supposed that the transmitting or receiving instrument has arrived at the point at which it is to be regulated by a line-current. The cam $a$ has made connection with the spring $b$, and the circuit of local battery B is closed through electro-magnet $m$. The result is that the line-wire, through the downward movement of the lever $d$, is removed from contact-screw $i$, and thereby from the transmitting or receiving apparatus; then put to earth or a discharging-battery by contact of lever-point $l$ with roller $o$; then removed from the earth or discharging-battery connection by the point $l$ leaving the roller $o$; and, finally, put to the electro-magnetic regulating apparatus $n$, and earth or battery, as the case may be. At this instant the transmitting or receiving apparatus is regulated by a line-current, when the cam $a$, passing from the spring $b$, removes battery B from the magnet $m$, and lever $d$ rises to repeat its connection to earth by way of roller $o$, then to pass from roller $o$, and finally make connection with upper contact-screw $i$.

The result of the downward motion of the lever $d$ is that the line, previously charged in the transmission of the message to a certain tension, is discharged by the lever making contact with the roller $o$, so that when the lever $d$ finally makes connection with the lower screw $j$, and thus puts the line to the electro-magnetic regulating apparatus n, there is no discharge from the line to interfere with the proper action of the same.

I do not limit myself to the employment of the roller o. The lever d may make contact with a flat spring, or in any other way the line may be momentarily put to earth. Nor do I limit myself to the employment of an electro-magnet to change the circuit, since a commutator may readily be arranged in the situation of the cam a and spring b to perform the entire work of the cam, spring, and electro-magnet m.

I am aware that the device of putting the line to earth or a discharging-battery to clear it of "tailings," after the transmission of an electric impulse, has long been employed; but my invention differs from such employment, in that it has no relation to clearing the line after each impulse of message-transmission currents, but of relieving the same of its static charge when the line is cut off from message-transmission and put to the work of regulating the instruments.

Having thus described my invention, what I claim as such, and desire to secure by Letters Patent, is—

The combination of an autographic-telegraph transmitting or receiving instrument, a regulator therefor, periodically operated by the transmission of a line-current, and a commutator, which puts the line to earth or to a discharging-battery previous to putting it to the regulator, substantially as shown and described.

WILLIAM EDWARD SAWYER.

Witnesses:
   JAMES G. SMITH,
   CHARLES E. KIMBALL.